United States Patent
Inoue et al.

(10) Patent No.: US 8,096,906 B2
(45) Date of Patent: Jan. 17, 2012

(54) CONTINUOUSLY VARIABLE TRANSMISSION AND CONTROL METHOD FOR CONTINUOUSLY VARIABLE TRANSMISSION

(75) Inventors: Takuichiro Inoue, Fujisawa (JP); Hiroki Iwasa, Machida (JP); Hiroyasu Tanaka, Atsugi (JP); Yoshihisa Kodama, Sagamihara (JP)

(73) Assignee: Jatco Ltd, Fuji-shi (JP)

( * ) Notice: Subject to any disclaimer, the term of this patent is extended or adjusted under 35 U.S.C. 154(b) by 0 days.

(21) Appl. No.: 11/955,868

(22) Filed: Dec. 13, 2007

(65) Prior Publication Data

US 2008/0153636 A1 Jun. 26, 2008

(30) Foreign Application Priority Data

Dec. 26, 2006 (JP) .................................. 2006-349420

(51) Int. Cl.
 *F16H 61/00* (2006.01)
(52) U.S. Cl. .................. 474/28; 474/8; 474/18; 474/70; 477/44; 477/45; 477/48; 477/50; 701/28; 701/51
(58) Field of Classification Search .................... 474/28, 474/18
See application file for complete search history.

(56) References Cited

U.S. PATENT DOCUMENTS

| 5,168,778 | A | 12/1992 | Todd et al. | |
| 6,547,693 | B1* | 4/2003 | Bolz et al. | 477/45 |
| 7,140,991 | B2* | 11/2006 | Sawada et al. | 474/28 |
| 2004/0127313 | A1* | 7/2004 | Shimanaka et al. | 474/18 |
| 2004/0127330 | A1* | 7/2004 | Sawada et al. | 477/44 |
| 2004/0127332 | A1* | 7/2004 | Kang et al. | 477/45 |

FOREIGN PATENT DOCUMENTS

| JP | 03-189460 A | | 8/1991 |
| JP | 03189460 A | * | 8/1991 |
| JP | 08-210450 A | | 8/1996 |
| JP | 2000097321 A | * | 4/2000 |
| JP | 2004-125011 A | | 4/2004 |

\* cited by examiner

*Primary Examiner* — Robert Siconolfi
*Assistant Examiner* — San Aung
(74) *Attorney, Agent, or Firm* — Foley & Lardner LLP

(57) ABSTRACT

When a vehicle decelerates rapidly, a lower limit secondary pulley pressure (Plmt) is calculated on the basis of a primary pulley rotation speed (Npri) detected by a primary pulley rotation sensor. When a deceleration speed (Gdata) is greater than a predetermined deceleration speed (G1) and a secondary pulley pressure (Psec) detected by a secondary pulley pressure sensor is lower than the lower limit secondary pulley pressure (Plmt), it is determined that slippage is about to occur in a V-belt 4 on a primary pulley side in particular, and therefore speed ratio fixing control is performed.

6 Claims, 5 Drawing Sheets

CONTINUOUSLY VARIABLE TRANSMISSION AND CONTROL METHOD FOR CONTINUOUSLY VARIABLE TRANSMISSION

FIELD OF THE INVENTION

This invention relates to a continuously variable transmission and a control method for a continuously variable transmission.

BACKGROUND OF THE INVENTION

In a vehicle installed with a continuously variable transmission, to ensure that slippage does not occur in a belt looped around a primary pulley and secondary pulley during rapid deceleration, for example, a primary pulley pressure is detected by a primary pulley pressure sensor, and when the primary pulley pressure decreases, a speed ratio change control valve is forcibly displaced to a speed ratio position in which oil pressure is temporarily introduced to the primary pulley. In so doing, belt slippage on the primary pulley side is suppressed. This so-called speed ratio fixing control is disclosed in JP2004-125011A.

SUMMARY OF THE INVENTION

However, in a continuously variable transmission not provided with a primary pulley pressure sensor, a reduction in the primary pulley pressure cannot be detected, and therefore belt slippage during rapid deceleration, for example, cannot be suppressed.

This invention has been designed to solve this problem, and it is an object thereof to suppress belt slippage in a continuously variable transmission not provided with a primary pulley pressure sensor when a vehicle decelerates rapidly, for example.

This present invention provides a continuously variable transmission which comprises an input side primary pulley which varies a groove width according to a first oil pressure, an output side secondary pulley which varies a groove width according to a second oil pressure, a belt looped around the primary pulley and the secondary pulley, having a contact radius with the pulleys which varies in accordance with the groove width, a first sensor which detects a rotation speed of the primary pulley, a second sensor which detects the second oil pressure, and a controller.

The controller determines a rapid deceleration state of the vehicle, calculates a lower limit secondary pulley pressure at which slippage occurs in the belt on the primary pulley side on the basis of the rotation speed of the primary pulley, determines that slippage is about to occur in the belt on the primary pulley side when the vehicle is determined to be in a state of rapid deceleration and the second oil pressure is lower than the lower limit secondary pulley pressure, and prevents a reduction in the first oil pressure, having determined that slippage is about to occur in the belt.

According to this invention, when the vehicle decelerates rapidly and the secondary pulley pressure is lower than the lower limit secondary pulley pressure calculated on the basis of the primary pulley rotation speed, it is determined that belt slippage is about to occur on the primary pulley side. Thus, it is possible to perform a belt slippage determination without using a primary pulley pressure sensor, and when it is determined that belt slippage is about to occur, the belt slippage can be suppressed by the primary pulley pressure reduction preventing means.

The details as well as other features and advantages of this invention are set forth in the remainder of the specification and are shown in the accompanying drawings.

DETAILED DESCRIPTION OF THE PREFERRED EMBODIMENT

Figure 1:
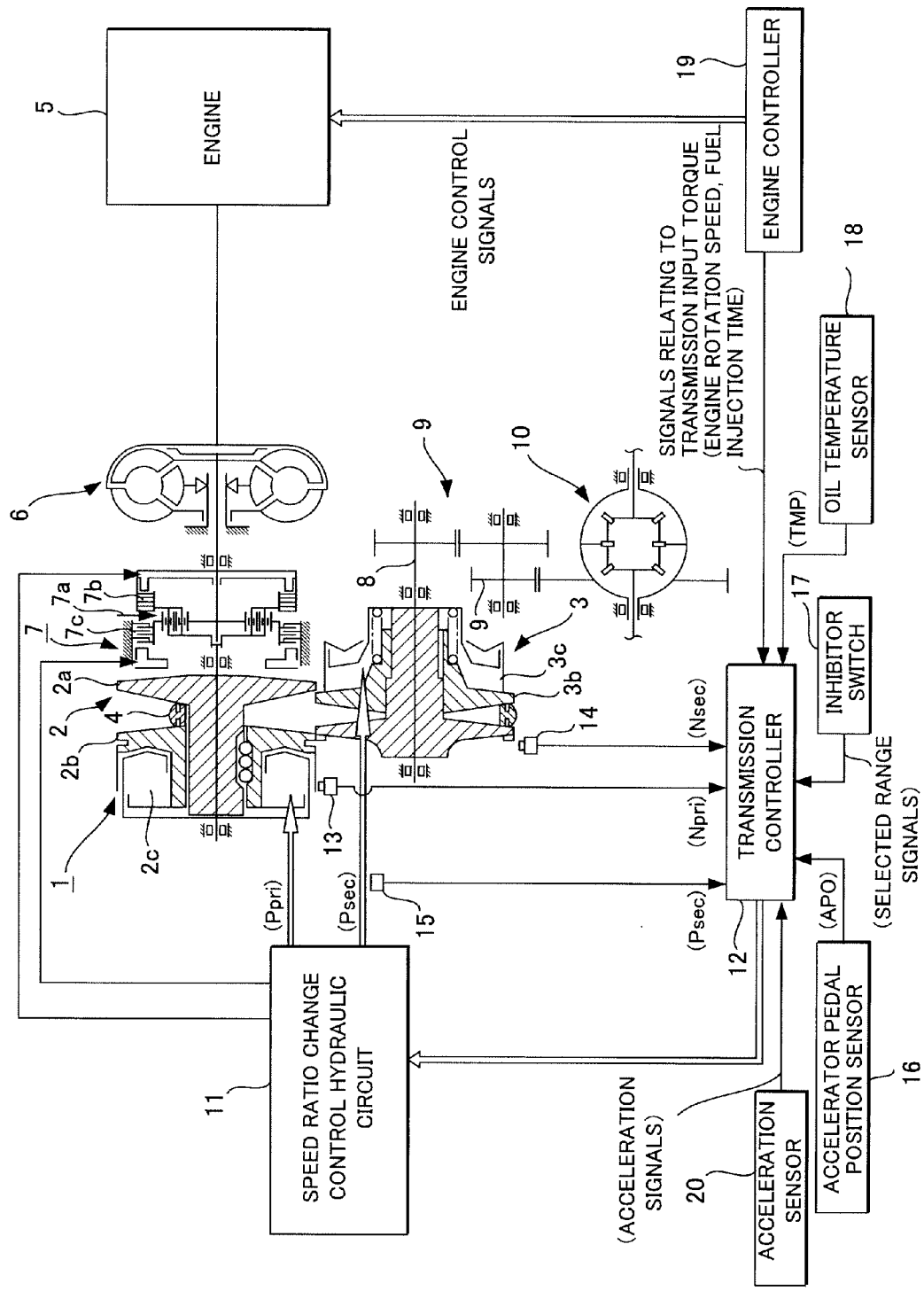
FIG. 1 is a schematic diagram of a continuously variable transmission according to an embodiment of this invention.

An embodiment of this invention will be described in detail below on the basis of the drawings. FIG. 1 shows an outline of a V-belt continuously variable transmission (to be referred to hereafter continuously variable transmission) 1. The V-belt continuously variable transmission 1 comprises a primary pulley 2 and a secondary pulley 3 arranged such that the V-grooves of the two are aligned, and a V-belt 4 which is looped around the V-grooves of the pulleys 2, 3. An engine 5 is disposed coaxial with the primary pulley 2, and a torque converter 6 comprising a lockup clutch and a forward-reverse switching mechanism 7 are provided between the engine 5 and primary pulley 2 in succession from the engine 5 side.

The forward-reverse switching mechanism 7 comprises a double pinion planetary gear set 7a as a principal constitutional element, the sun gear thereof being joined to the engine 5 via the torque converter 6 and the carrier thereof being joined to the primary pulley 2. The forward-reverse switching mechanism 7 further comprises a forward clutch 7b which is directly coupled between the sun gear and carrier of the double pinion planetary gear set 7a, and a reverse brake 7c which fixes a ring gear. When the forward clutch 7b is engaged, an input rotation input from the engine 5 via the torque converter 6 is transmitted to the primary pulley 2 as is, and when the reverse brake 7c is engaged, the input rotation input from the engine 5 via the torque converter 6 is reversed and transmitted to the secondary pulley 3.

The rotation of the primary pulley 2 is transmitted to the secondary pulley 3 via the V-belt 4, and the rotation of the secondary pulley 3 is transmitted thereafter to a vehicle wheel, not shown in the drawing, via an output shaft 8, a gear set 9, and a differential gear device 10.

To make a rotation transmission ratio (speed ratio) between the primary pulley 2 and secondary pulley 3 variable during this power transmission, the sheaves forming the respective V-grooves of the primary pulley 2 and secondary pulley 3 are divided into fixed sheaves 2a, 3a, and movable sheaves 2b, 3b which are capable of axial displacement. The movable sheaves 2b, 3b are biased toward the fixed sheaves 2a, 3a through the supply of a primary pulley pressure (first oil pressure) (Ppri) and a secondary pulley pressure (second oil pressure) (Psec), which are generated using a line pressure as a source pressure, to a primary pulley chamber 2c and a secondary pulley chamber 3c. As a result, the V-belt 4 is caused to frictionally engage with the sheaves such that power transmission between the primary pulley 2 and secondary pulley 3 is performed.

During a speed ratio change, the V-groove width of the two pulleys 2, 3 is varied by the differential pressure between the primary pulley pressure (Ppri) and secondary pulley pressure (Psec), which are generated in accordance with a target speed ratio (I(o)), and by continuously varying the looped arc diameter of the V-belt 4 relative to the pulleys 2, 3, an actual speed ratio (to be referred to here after speed ratio) (ip) is varied, and the target speed ratio (I(o)) is realized.

The primary pulley pressure (Ppri) and secondary pulley pressure (Psec) are controlled by a speed ratio change control hydraulic circuit 11 together with the output of an engagement oil pressure of the forward clutch 7b, which is engaged when a forward traveling range is selected, and an engagement oil pressure of the reverse brake 7c, which is engaged when a reverse traveling range is selected. The speed ratio change control hydraulic circuit 11 performs control in response to a signal from a transmission controller 12.

Signals from a primary pulley rotation sensor 13 which detects a primary pulley rotation speed (Npri), signals from a secondary pulley rotation sensor 14 which detects a secondary pulley rotation speed (Nsec), signals from a secondary pulley pressure sensor 15 which detects the secondary pulley pressure (Psec), signals from an accelerator opening sensor 16 which detects an accelerator pedal depression amount (APO), selected range signals from an inhibitor switch 17, signals from an oil temperature sensor 18 which detects a hydraulic fluid temperature (TMP), signals (engine rotation speed and fuel injection time) relating to a transmission input torque (Ti) from an engine controller 19 which controls the engine 5, and signals from an acceleration sensor 20, are input into the transmission controller 12.

Figure 2:
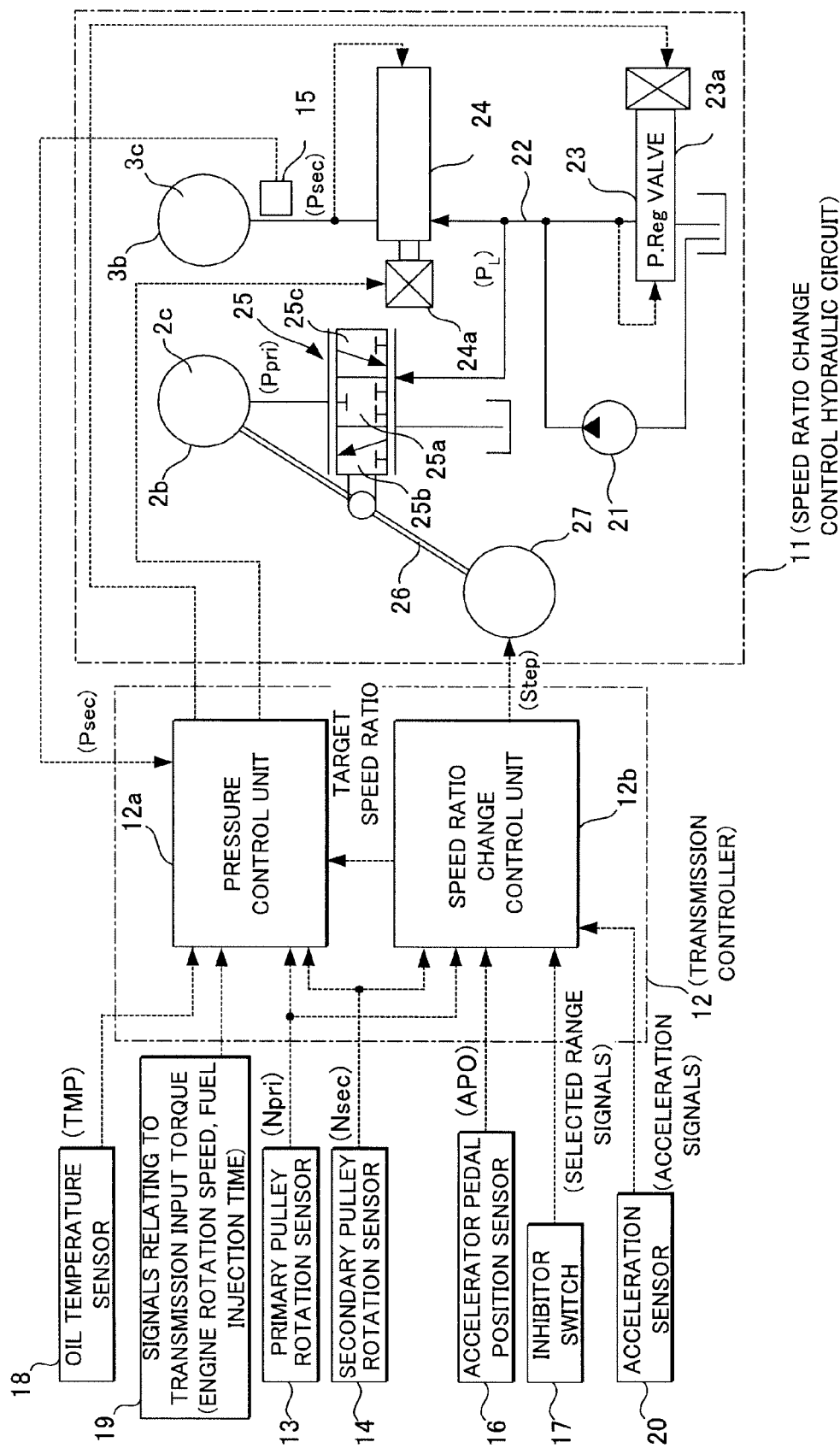
FIG. 2 is a schematic diagram of a speed ratio change control hydraulic circuit and a transmission controller according to an embodiment of this invention.

Next, the speed ratio change control hydraulic circuit 11 and transmission controller 12 will be described using the schematic diagram in FIG. 2. First, the speed ratio change control hydraulic circuit 11 will be described.

The speed ratio change control hydraulic circuit 11 comprises an engine-driven oil pump 21, and the pressure of a hydraulic fluid supplied to an oil passage 22 by the oil pump 21 is regulated to a predetermined line pressure (PL) by a pressure regulator valve 23. The pressure regulator valve 23 controls the line pressure (PL) in accordance with a drive duty input into a solenoid 23a.

The line pressure (PL) in the oil passage 22 is adjusted by a pressure reducing valve 24 and supplied to the secondary pulley chamber 3c as the secondary pulley pressure (Psec) on the one hand, and adjusted by a speed ratio change control valve 25 and supplied to the primary pulley chamber 2c as the primary pulley pressure (Ppri) on the other hand. The pressure reducing valve 24 controls the secondary pulley pressure (Psec) in accordance with a drive duty input into a solenoid 24a.

The speed ratio change control valve 25 comprises a neutral position 25a, a pressure increasing position (first position) 25b, and a pressure reducing position (second position) 25c, and to switch between these valve positions, the speed control valve 25 is connected to the middle of a speed ratio change link 26. The speed ratio change link 26 is connected to a step motor 27 serving as a speed ratio change actuator at one end thereof, and to the movable sheave 2b of the primary pulley 2 at the other end thereof.

The step motor 27 is set in an operating position which is advanced from a home position by a step count (Step) corresponding to the target speed ratio (I(o)), and through the operation of the step motor 27, the speed ratio change link 26 swings using a connecting portion with the movable sheave 2b as a fulcrum. As a result, the speed ratio change control valve 25 is moved from the neutral position 25a to the pressure increasing position 25b or the pressure reducing position 25c. Hence, the primary pulley pressure (Ppri) is increased using the line pressure (PL) as a source pressure or decreased through a drain, and thus the differential pressure between the primary pulley pressure (Ppri) and secondary pulley pressure (Psec) is varied so as to generate an upshift to a high side speed ratio or a downshift to a low side speed ratio. Accordingly, the speed ratio (ip) follows the target speed ratio (I(o)).

The speed ratio change advancement is fed back to the corresponding end of the speed ratio change link 26 via the movable sheave 2b of the primary pulley 2, and the speed ratio change link 26 swings about a connecting portion with the step motor 27 in a direction which returns the speed ratio change control valve 25 from the pressure increasing position 25b or the pressure reducing position 25c to the neutral position 25a. Hence, when the target speed ratio (I(o)) is reached, the speed ratio change control valve 25 is returned to the neutral position 25a so that the target speed ratio (I(o)) can be maintained.

The solenoid drive duty of the pressure regulator valve 23, the solenoid drive duty of the pressure reducing valve 24, and a speed ratio change command (step count) input into the step motor 27 are issued by the transmission controller 12. The transmission controller 12 also performs control to determine whether or not to supply the engagement oil pressure to the forward clutch 7b and reverse brake 7c shown in FIG. 1. The transmission controller 12 is constituted by a pressure control unit 12a and a speed ratio change control unit 12b.

The pressure control unit 12a determines a solenoid drive duty of the pressure regulator valve 23 and a solenoid drive duty of the pressure reducing valve 24, and a speed ratio change control unit 12b calculates an attained speed ratio (Ip) and the target speed ratio (I(o)).

Figure 3:
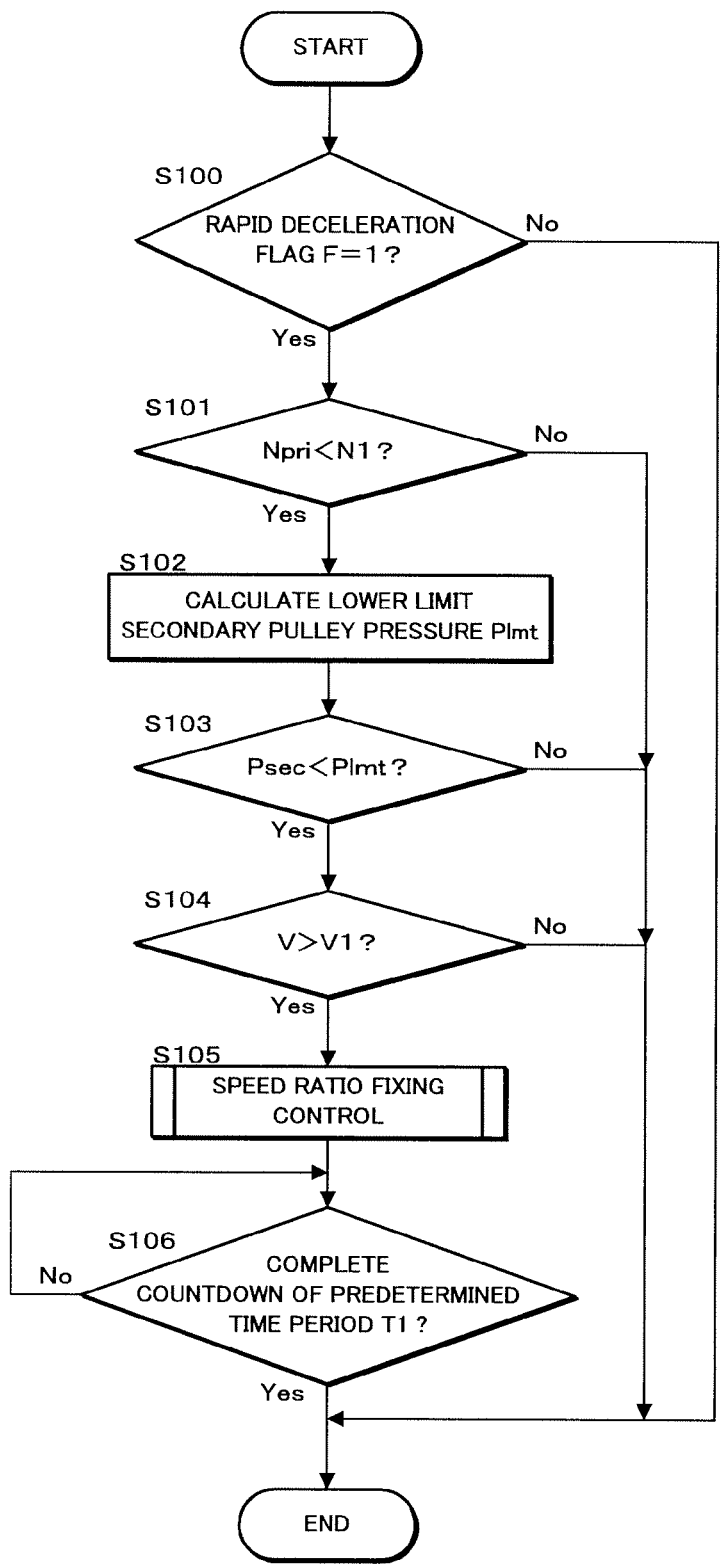
FIG. 3 is a flowchart illustrating speed ratio fixing control according to an embodiment of this invention.

Next, speed ratio fixing control performed when the vehicle decelerates will be described using the flowchart in FIG. 3.

In a step S100, a determination is made as to whether or not the vehicle is decelerating rapidly according to the value of a rapid deceleration flag (F). When the rapid deceleration flag (F) is at 1, it is determined that rapid deceleration is underway, and the routine advances to a step S101. When the rapid deceleration flag (F) is not at 1 (=0), it is determined that rapid deceleration is not underway, and the control is terminated.

Figure 5:
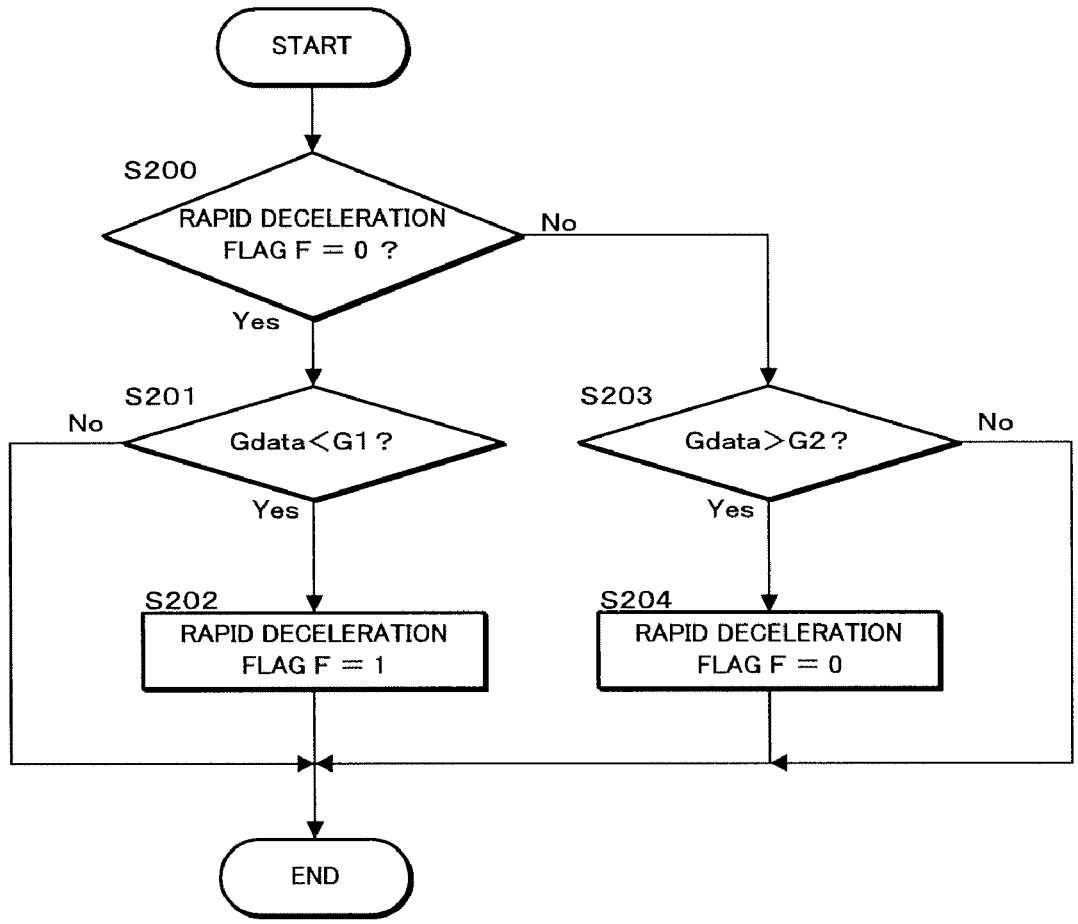
FIG. 5 is a flowchart for determining rapid deceleration of a vehicle, according to an embodiment of this invention.

As shown in the flowchart in FIG. 5, the rapid deceleration flag (F) is set at 1 when a deceleration speed (acceleration speed) (Gdata) detected by the acceleration sensor 20 is smaller than a predetermined deceleration speed (G1) (an affirmative determination is obtained in a step S201) (step S202), and when the deceleration speed (Gdata) exceeds a predetermined deceleration speed (G2) (an affirmative determination is obtained in a step S203) after the rapid deceleration flag (F) has been set at 1, the rapid deceleration flag (F) is set at 0 (step S204). An initial value of the rapid deceleration flag (F) following engine startup is set at 0.

Here, the deceleration speed is detected as a negative output value of the acceleration sensor 20. Accordingly, both the predetermined deceleration speed (G1) and the predetermined deceleration speed (G2) are set at values equal to or lower than zero, and the magnitude relationship between them is set at (G1)<(G2).

In other words, rapid deceleration is determined to be underway from a point at which the vehicle begins to decelerate at a large deceleration speed exceeding the predetermined deceleration speed (G1) ((Gdata)<(G1)) to a point at which the vehicle returns to a smaller deceleration speed than the predetermined deceleration speed (G2) ((Gdata)>(G2)).

In the step S101, the primary pulley rotation speed (Npri) is detected by the primary pulley rotation sensor 13, and the detected primary pulley rotation speed (Npri) is compared with a predetermined rotation speed (N1). When the primary pulley rotation speed (Npri) is smaller than the predetermined rotation speed (N1), the routine advances to a step S102, and when the primary pulley rotation speed (Npri) is larger than the predetermined rotation speed (N1), the control is terminated.

Figure 4:
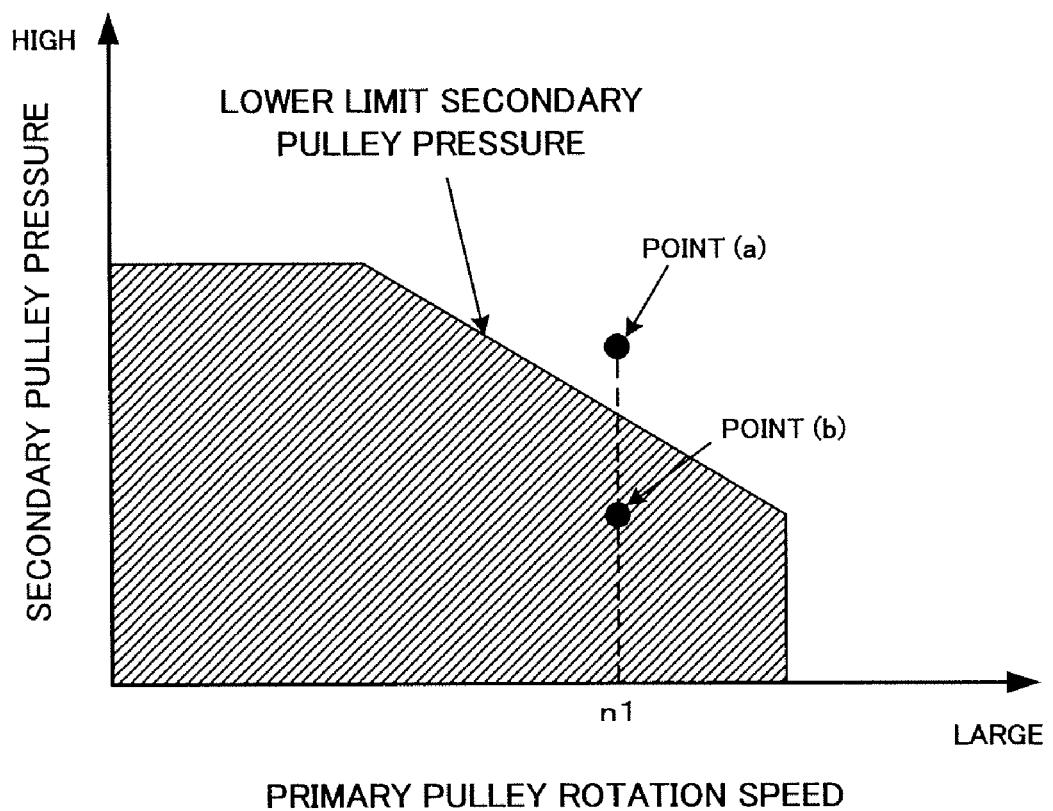
FIG. 4 is a map showing a relationship between a primary pulley rotation speed and a lower limit secondary pulley pressure, according to this invention.

In the step S102, a lower limit secondary pulley pressure (Plmt) is calculated from a map shown in FIG. 4 on the basis of the primary pulley rotation speed (Npri) detected in the step S101. FIG. 4 is a map showing a relationship between the primary pulley rotation speed (Npri) and the lower limit secondary pulley pressure (Plmt) at which slippage occurs in the V-belt 4.

In a step S103, the secondary pulley pressure (Psec) is detected by the secondary pulley pressure sensor 15, and the detected secondary pulley pressure (Psec) is compared with the lower limit secondary pulley pressure (Plmt) calculated in the step S102. When the secondary pulley pressure (Psec) is lower than the lower limit secondary pulley pressure (Plmt), it is determined that the gripping force of the V-belt 4 is too small to prevent slippage in the V-belt 4, and therefore the routine advances to a step S104. When the secondary pulley pressure (Psec) is higher than the lower limit secondary pulley pressure (Plmt), it is determined that the gripping force of the V-belt 4 is large enough to prevent slippage in the V-belt 4, and therefore the control is terminated.

In FIG. 4, when the primary pulley rotation speed (Npri) corresponds to a rotation speed (n1), for example, and the secondary pulley pressure (Psec) is at a point (a) on the map, slippage does not occur in the V-belt 4. When the secondary pulley pressure (Psec) is at a point (b) on the map, however, slippage is likely to occur in the V-belt 4. In other words, when the relationship between the primary pulley rotation speed (Npri) and the secondary pulley pressure (Psec) is located in a region denoted by diagonal lines in FIG. 4, the force with which the primary pulley 2 and secondary pulley 3 grip the V-belt 4 is small, and therefore it is determined that slippage is likely to occur in the V-belt 4.

When the vehicle decelerates, the step motor 27 is set in a low side operating position to shift the speed ratio (ip) to the low side speed ratio, and as a result, the speed ratio change control valve 25 shifts to the pressure reducing position 25c and the primary pulley pressure (Ppri) is drained so as to decrease. Further, the secondary pulley pressure (Psec) is set at a predetermined pressure in order to realize the desired speed ratio. The movable sheave 2b of the primary pulley 2 is moved by the tension applied to the V-belt 4 by the secondary pulley pressure (Psec), and when the movable sheave 2b reaches a position corresponding to the desired speed ratio, the speed ratio change control valve 25 reaches a neutral position 25b. As a result, the desired speed ratio is realized.

However, when the secondary pulley pressure (Psec) remains low even after the operating position of the step motor 27 has been set in a low side operating position and the primary pulley pressure (Ppri) has been drained, the movable sheave 2b of the primary pulley 2 is not moved by the tension on the V-belt 4, and the speed ratio change control valve 25 remains in the pressure reducing position 25c. As a result, the primary pulley pressure (Ppri) is drained further, leading to a reduction in the gripping force of the V-belt 4 and an increase in the likelihood of slippage in the V-belt 4. This is particularly likely to occur when the vehicle decelerates rapidly, and slippage is particularly likely to occur in the V-belt 4 on the primary pulley side.

In this embodiment, when the vehicle decelerates rapidly, the lower limit secondary pulley pressure (Plmt) at which slippage occurs in the V-belt 4 is calculated on the basis of the primary pulley rotation speed (Npri) and compared with the actual secondary pulley pressure (Psec). When the secondary pulley pressure (Psec) is lower than the lower limit secondary pulley pressure (Plmt), it is determined that the gripping force of the V-belt 4 is too small to prevent slippage from occurring in the V-belt 4 on the primary pulley side.

In the step S104, the secondary pulley rotation speed (Nsec) is detected by the secondary pulley rotation sensor 14, and a vehicle speed (V) is calculated on the basis of the detected secondary pulley rotation speed (Nsec). The vehicle speed (V) is then compared with a predetermined vehicle speed (V1), and when the vehicle speed (V) is larger than the predetermined vehicle speed (V1), the routine advances to a step S105. When the vehicle speed (V) is smaller than the predetermined vehicle speed (V1), the control is terminated. The predetermined vehicle speed (V1) is a vehicle speed for determining whether or not the vehicle is stationary.

In the step S105, speed ratio fixing control is performed to suppress slippage in the V-belt 4. During speed ratio fixing control, the speed ratio change control valve 25 is set in the pressure increasing position 25b or the neutral position 25a by setting the target speed ratio (I(o)) at the speed ratio of a predetermined previous time, and the primary pulley pressure (Ppri) is supplied. Here, the primary pulley pressure (Ppri) is increased, or a reduction in the primary pulley pressure (Ppri) is prevented, by shifting the target speed ratio (I(o)) to the high side speed ratio by a predetermined amount, and as a result, the gripping force of the V-belt 4 is increased, thereby suppressing slippage in the V-belt 4.

In a step S106, following the start of speed ratio fixing control, countdown of a predetermined time period (T1) is begun, and when countdown of the predetermined time period (T1) is complete, the control is terminated. The predetermined time period (T1) is a time period during which the primary pulley pressure (Ppri) is increased sufficiently to suppress slippage in the V-belt 4.

With the control described above, when slippage becomes likely to occur in the V-belt 4 during rapid deceleration of the vehicle, slippage of the V-belt 4 can be suppressed by performing speed ratio fixing control.

The effects of this embodiment of the invention will now be described.

In this embodiment, when the vehicle decelerates rapidly, the lower limit secondary pulley pressure (Plmt) at which slippage may occur in the V-belt 4 is calculated on the basis of the primary pulley rotation speed (Npri). The secondary pulley pressure (Psec) detected by the secondary pulley pressure sensor 15 is then compared with the lower limit secondary pulley pressure (Plmt), and when the secondary pulley pressure (Psec) is lower than the lower limit secondary pulley pressure (Plmt), it is determined that slippage is about to occur in the V-belt 4, particularly on the primary pulley side, and speed ratio fixing control is initiated. Thus, belt slippage during rapid deceleration can be suppressed without using a primary pulley pressure sensor.

When it is determined that slippage is about to occur in the V-belt 4, speed ratio fixing control is performed to increase the primary pulley pressure (Ppri) or prevent a reduction in the primary pulley pressure (Ppri) by shifting the target speed ratio (I(o)) to the high side speed ratio by a predetermined amount, and as a result, belt slippage can be suppressed.

This application claims priority from Japanese Patent Application 2006-349420, filed Dec. 26, 2006, which is incorporated herein by reference in its entirety.

What is claimed is:

1. A continuously variable transmission comprising:
   an input side primary pulley which varies a groove width according to a first oil pressure;
   an output side secondary pulley which varies a groove width according to a second oil pressure;
   a belt looped around the primary pulley and the secondary pulley, having a contact radius with the pulleys which varies in accordance with the groove width;
   an oil pump driven by an engine;
   a first sensor which detects a rotation speed of the primary pulley;
   a second sensor which detects the second oil pressure; and
   a controller, which:
      determines a rapid deceleration state of a vehicle;
      calculates a lower limit secondary pulley pressure at which slippage occurs in the belt on the primary pulley side on the basis of the rotation speed of the primary pulley;
      determines that slippage is about to occur in the belt on the primary pulley side when the vehicle is determined to be in a state of rapid deceleration and the second oil pressure which is detected by the second sensor is lower than the lower limit secondary pulley pressure; and
      prevents a reduction in the first oil pressure, having determined that slippage is about to occur in the belt.

2. The continuously variable transmission as defined in claim 1, further comprising:
   a speed ratio change actuator; and
   a speed ratio change control valve which is switched between a first position for increasing the first oil pressure, a second position for reducing the first oil pressure, and a neutral position in accordance with a displacement of the speed ratio change actuator, wherein
   the controller shifts a speed ratio target value to a high side speed ratio by a predetermined amount, holds the speed ratio target value on the high side speed ratio, and switches the speed ratio change control valve to the first position or the neutral position by driving the speed ratio change actuator on the basis of the speed ratio target value, having determined that slippage is about to occur in the belt.

3. A control method for a continuously variable transmission, the continuously variable transmission comprising:
   an input side primary pulley which varies a groove width according to a first oil pressure;
   an output side secondary pulley which varies a groove width according to a second oil pressure;
   a belt looped around the primary pulley and the secondary pulley, having a contact radius with the pulleys which varies in accordance with the groove width;
   an oil pump driven by an engine;
   a first sensor which detects a rotation speed of the primary pulley; and
   a second sensor which detects the second oil pressure;
   the control method comprising:
      determining a rapid deceleration state of a vehicle;
      calculating a lower limit secondary pulley pressure at which slippage occurs in the belt on the primary pulley side on the basis of a rotation speed of the primary pulley;
      determining that slippage is about to occur in the belt on the primary pulley side when the vehicle is determined to be in a state of rapid deceleration and the second oil pressure which is detected by the second sensor is lower than the lower limit secondary pulley pressure; and
      preventing a reduction in the first oil pressure, having determined that slippage is about to occur in the belt.

4. The control method for a continuously variable transmission as defined in claim 3, wherein the continuously variable transmission further comprising:
   a speed ratio change actuator; and
   a speed ratio change control valve which is switched between a first position for increasing the first oil pressure, a second position for reducing the first oil pressure, and a neutral position in accordance with a displacement of the speed ratio change actuator;
   the control method further comprising:
      when it is determined that slippage is about to occur in the belt, shifting a speed ratio target value to a high side speed ratio by a predetermined amount, holding the speed ratio target value on the high side speed ratio, and switching the speed ratio change control valve to the first position or the neutral position by driving the speed ratio change actuator on the basis of the speed ratio target value.

5. A continuously variable transmission comprising:
   an input side primary pulley which varies a groove width according to a first oil pressure;
   an output side secondary pulley which varies a groove width according to a second oil pressure;
   a belt looped around the primary pulley and the secondary pulley, having a contact radius with the pulleys which varies in accordance with the groove width;
   an oil pump driven by an engine;
   a first sensor which detects a rotation speed of the primary pulley;
   a second sensor which detects the second oil pressure;
   means for determining a rapid deceleration state of a vehicle;
   means for detecting a rotation speed of the primary pulley;
   means for calculating a lower limit secondary pulley pressure at which slippage occurs in the belt on the primary pulley side on the basis of the rotation speed of the primary pulley;
   means for detecting the second oil pressure;
   means for determining that slippage is about to occur in the belt on the primary pulley side when the vehicle is determined to be in a state of rapid deceleration and the second oil pressure which is detected by the second sensor is lower than the lower limit secondary pulley pressure; and
   means for preventing a reduction in the first oil pressure, having determined that slippage is about to occur in the belt.

6. The continuously variable transmission as defined in claim 5, further comprising:
   a speed ratio change actuator; and
   a speed ratio change control valve which is switched between a first position for increasing the first oil pressure, a second position for reducing the first oil pressure, and a neutral position in accordance with a displacement of the speed ratio change actuator; wherein
   the means for preventing the reduction in the first oil pressure shifts a speed ratio target value to a high side speed ratio by a predetermined amount, holds the speed ratio target value on the high side speed ratio, and switches the speed ratio change control valve to the first position or the neutral position by driving the speed ratio change actuator on the basis of the speed ratio target value, having determined that slippage is about to occur in the belt.

* * * * *